US012764632B2

(12) United States Patent
Kinoshita

(10) Patent No.: US 12,764,632 B2
(45) Date of Patent: Oct. 13, 2026

(54) # IAB DONOR, CONTROL METHOD, COMPUTER-READABLE STORAGE MEDIUM, AND CONTROL APPARATUS

(71) Applicant: CANON KABUSHIKI KAISHA, Tokyo (JP)

(72) Inventor: Akihisa Kinoshita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 18/633,651

(22) Filed: Apr. 12, 2024

(65) Prior Publication Data

US 2024/0259912 A1 Aug. 1, 2024

Related U.S. Application Data

(63) Continuation of application No. PCT/JP2022/039073, filed on Oct. 20, 2022.

(30) Foreign Application Priority Data

Nov. 8, 2021 (JP) ................................ 2021-182058

(51) Int. Cl.
*H04W 40/22* (2009.01)
*H04W 40/34* (2009.01)
*H04W 84/18* (2009.01)

(52) U.S. Cl.
CPC .................................. *H04W 40/22* (2013.01)

(58) Field of Classification Search
CPC ..... H04W 40/22; H04W 40/32; H04W 40/34; H04W 40/02; H04W 84/18
See application file for complete search history.

(56) References Cited

U.S. PATENT DOCUMENTS 12,294,895 B2 * 5/2025 Liu .................. H04W 36/0033
2021/0160735 A1 * 5/2021 Fujishiro .......... H04W 28/0278
(Continued)

FOREIGN PATENT DOCUMENTS

JP 2018525874 A 9/2018
WO 2014119112 A1 8/2014
(Continued)

OTHER PUBLICATIONS

Japanese Office Action dated Dec. 23, 2025 in counterpart Japanese Patent Appln. No. 2021-182058.
(Continued)

*Primary Examiner* — Kenny S Lin
(74) *Attorney, Agent, or Firm* — Venable LLP

(57) ABSTRACT

An IAB donor in a wireless communication system that uses an IAB (Integrated Access and Backhaul) technique defined by the Third Generation Partnership Project (3GPP) determines, based on at least the number of equipments connected on a first communication path including an IAB donor, a first IAB node under the IAB donor, and a second IAB node under the first IAB node, whether to change a communication path, in a case where it is determined to change the communication path, changes a connection destination of the second IAB node to a third IAB node constituting a communication path different from the first communication path, and sets a second communication path for relaying communication between the second IAB node and equipment under the second IAB node, and the IAB donor via the third IAB node.

11 Claims, 10 Drawing Sheets

(56) References Cited

U.S. PATENT DOCUMENTS

| | | | | |
|---|---|---|---|---|
| 2021/0219368 | A1* | 7/2021 | Fujishiro | H04W 76/27 |
| 2021/0243672 | A1* | 8/2021 | Deshmukh | H04W 40/24 |
| 2021/0266815 | A1* | 8/2021 | Wei | H04W 40/12 |
| 2021/0321298 | A1* | 10/2021 | Keskitalo | H04W 84/047 |
| 2022/0014976 | A1* | 1/2022 | Luo | H04W 36/0044 |
| 2022/0117007 | A1* | 4/2022 | Akl | H04W 36/087 |
| 2022/0408326 | A1* | 12/2022 | Akl | H04W 36/0064 |
| 2023/0180068 | A1* | 6/2023 | Xu | H04W 36/00 |
| 2023/0232287 | A1* | 7/2023 | Vangala | H04W 36/0235 370/331 |
| 2023/0397084 | A1* | 12/2023 | Shah | H04W 40/12 |
| 2024/0314546 | A1* | 9/2024 | Xu | H04W 8/26 |
| 2024/0314789 | A1* | 9/2024 | Yu | H04L 1/1854 |
| 2024/0365183 | A1* | 10/2024 | Chen | H04W 36/0069 |

FOREIGN PATENT DOCUMENTS

| | | | |
|---|---|---|---|
| WO | 2017004253 | A1 | 1/2017 |
| WO | 2020031269 | A1 | 2/2020 |
| WO | 2020080044 | A1 | 4/2020 |

OTHER PUBLICATIONS

International Search Report and Written Opinion dated Jan. 10, 2023 in PCT Appln. No. PCT/JP2022/039073.

Extended European Search Report dated Sep. 3, 2025 in counterpart European Appln. No. 22889789.

* cited by examiner

FIG. 4

| | | PATH 1 | PATH 2 |
|---|---|---|---|
| IAB NODE 103 | CONNECTION DESTINATION | IAB DONOR 102 | — |
| | ALLOWABLE ACCOMMODATION NUMBER | 12 | — |
| | ACCOMMODATION NUMBER | 8 | — |
| | MOVEMENT DESTINATION CANDIDATE | IAB DONOR 102 | — |
| IAB NODE 104 | CONNECTION DESTINATION | IAB NODE 103 | — |
| | ALLOWABLE ACCOMMODATION NUMBER | 8 | — |
| | ACCOMMODATION NUMBER | 8 | — |
| | MOVEMENT DESTINATION CANDIDATE | IAB NODE 103/105 | — |
| IAB NODE 107 | CONNECTION DESTINATION | IAB NODE 104 | — |
| | ALLOWABLE ACCOMMODATION NUMBER | 5 | — |
| | ACCOMMODATION NUMBER | 4 | — |
| | MOVEMENT DESTINATION CANDIDATE | IAB NODE 104/105/106 | — |
| IAB NODE 105 | CONNECTION DESTINATION | — | IAB DONOR 102 |
| | ALLOWABLE ACCOMMODATION NUMBER | — | 20 |
| | ACCOMMODATION NUMBER | — | 6 |
| | MOVEMENT DESTINATION CANDIDATE | — | IAB DONOR 102 |
| IAB NODE 106 | CONNECTION DESTINATION | — | IAB NODE 105 |
| | ALLOWABLE ACCOMMODATION NUMBER | — | 12 |
| | ACCOMMODATION NUMBER | — | 6 |
| | MOVEMENT DESTINATION CANDIDATE | — | IAB NODE 105/103 |

FIG. 7

| NUMBER OF HOPS | ALLOWABLE ACCOMMODATION NUMBER |
|---|---|
| 1 | 12 |
| 2 | 8 |
| 3 | 4 |

IAB DONOR, CONTROL METHOD, COMPUTER-READABLE STORAGE MEDIUM, AND CONTROL APPARATUS

CROSS-REFERENCE TO RELATED APPLICATIONS

This application is a Continuation of International Patent Application No. PCT/JP2022/039073, filed Oct. 20, 2022, which claims the benefit of Japanese Patent Application No. 2021-182058, filed Nov. 8, 2021, both of which are hereby incorporated by reference herein in their entirety.

BACKGROUND OF THE INVENTION

Field of the Invention

The present invention relates to a relay channel setting technique.

Background Art

In the Third Generation Partnership Project (3GPP), IAB (Integrated Access and Backhaul) that integrates access lines and backhaul lines is being standardized (see Japanese Patent Laid-Open No. 2018-525874). In IAB, a radio resource used for an access line between a base station and user equipment (UE) is also used for a backhaul line. For example, a radio resource of the millimeter wave band such as the 28-GHz band can be used in IAB. By using IAB, a relay device (IAB node) can relay communication between a base station device (IAB donor) and user equipment by a radio channel. Compared to using a line such as an optical fiber, the area coverage can be widened at low cost.

In IAB, it is important to properly set a communication path in order to relay communication of a UE.

SUMMARY OF THE INVENTION

According to one aspect of the present invention, an IAB donor in a wireless communication system using an IAB (Integrated Access and Backhaul) technique defined by the Third Generation Partnership Project (3GPP), the wireless communication system including at least one IAB node configured to relay communication between a core network and equipment, and an IAB donor configured to relay communication between the IAB node and the core network, comprises a determination unit configured to determine, based on at least the number of equipments connected on a first communication path including the IAB donor, a first IAB node under the IAB donor, and a second IAB node under the first IAB node, whether to change a communication path, and a setting unit configured to, when the determination unit determines to change the communication path, change a connection destination of the second IAB node to a third IAB node constituting a communication path different from the first communication path, and set a second communication path for relaying communication between the second IAB node and equipment under the second IAB node, and the IAB donor via the third IAB node.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a table showing an example of information used to switch the connection destination of an IAB node.

FIG. 7 is a table for explaining an example of the relationship between the number of hops from the IAB donor and the allowable accommodation number of UEs.

DESCRIPTION OF THE EMBODIMENTS

Figure 1:
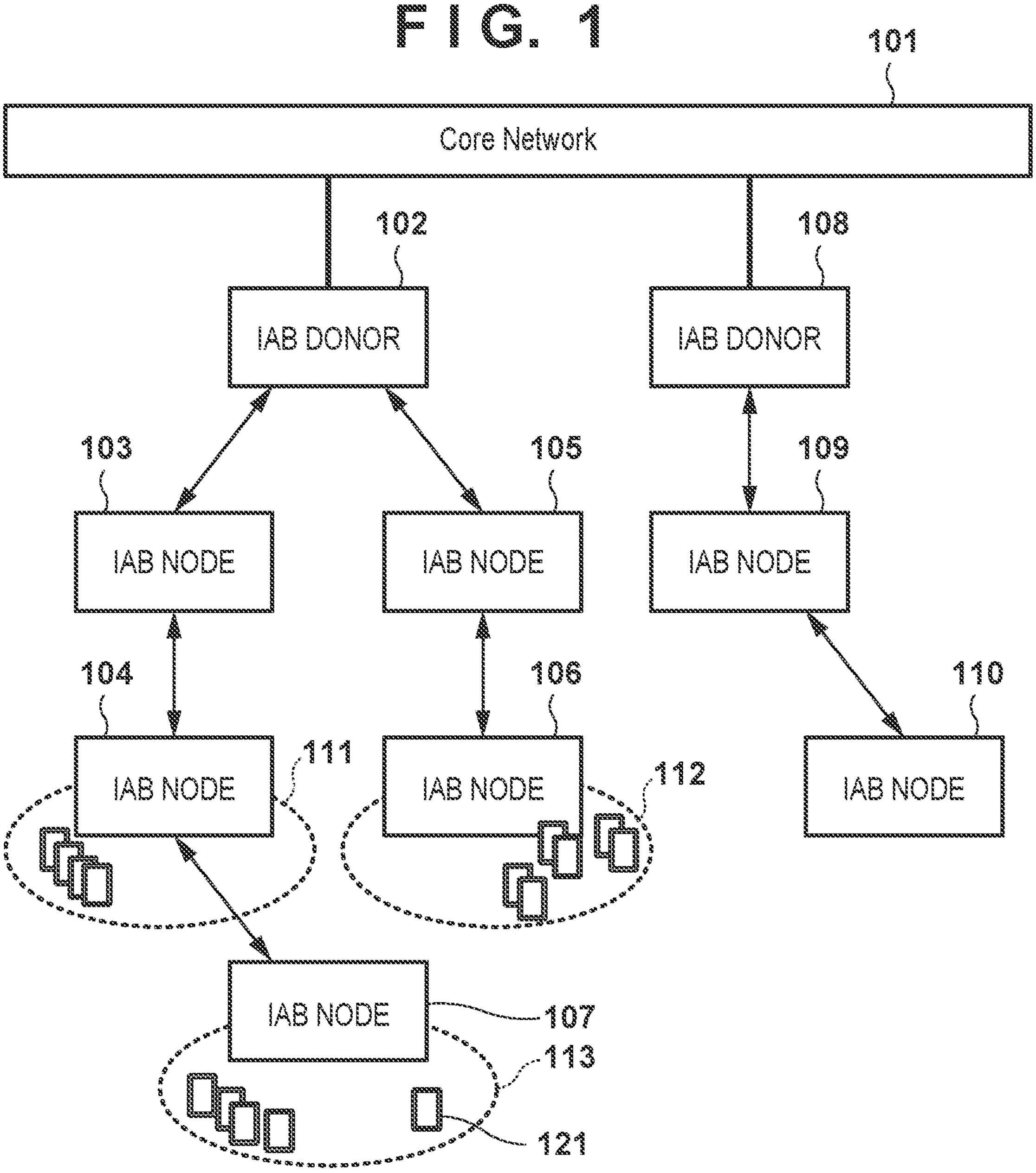
FIG. 1 is a view showing an example of the configuration of a wireless communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Configuration)

FIG. 1 shows an example of the configuration of a wireless communication system according to an embodiment. The wireless communication system is a relay communication system based on IAB (Integrated Access and Backhaul) defined in the Third Generation Partnership Project (3GPP) cellular communication standards. In IAB, the wireless communication system includes an IAB donor 102 and an IAB donor 108 connected to a core network 101. The IAB donor 102 and the IAB donor 108 function as base station devices and establish wireless connections to mobile terminations at IAB nodes. The IAB donor 102 and the IAB donor 108 perform BAP (Backhaul Adaptation Protocol) setting and enable the IAB nodes to function as relay devices. For example, an IAB node 103 and an IAB node 105 are connected to the IAB donor 102, and a communication path via the IAB donor 102 and the IAB node 103 and a communication path via the IAB donor 102 and the IAB node 105 are set. Also, an IAB node 109 is connected to the IAB donor 108, and a communication path via the IAB donor 108 and the IAB node 109 is set.

Note that an IAB node can connect to another IAB node directly or indirectly connected to an IAB donor. In this case, communication between the IAB node and the IAB donor is performed via the other IAB node. For example, an IAB node 104 can establish a connection to the IAB donor 102 via the IAB node 103 and set a communication path. Similarly, an IAB node 106 can establish a connection to the IAB donor 102 via the IAB node 105, and an IAB node 110 can connect to the IAB donor 108 via the IAB node 109. Further, an IAB node 107 can connect to, for example, the IAB node 104 and establish a communication path up to the IAB donor 102. Note that the IAB node 107 may be configured so that it can simultaneously connect to the IAB node 106 and the IAB node 105 in addition to the IAB node 104 by using, for example, Dual Connectivity.

In this embodiment, when viewed from one IAB node, a directly connected node on a side closer to the core network 101 than the IAB node on an established communication path will be called a parent node. When viewed from the IAB node, a directly connected node on a side farther from the core network 101 on the communication path will be called a child node. For example, the parent node of the IAB node 104 is the IAB node 103, and the child node of the IAB node 104 is the IAB node 107. Similarly, when viewed from the IAB node 109, the IAB donor 108 is a parent node and the IAB node 110 is a child node. In the above-described manner, a relay network of a tree structure starting from an IAB donor is formed in the wireless communication system according to this embodiment.

Note that an IAB node (and an IAB donor in some cases) performs not only communication of a backhaul line but also communication of an access line. For example, the IAB node constitutes a cell using access line antenna common to a backhaul line antenna or separately prepared, establishes an access line with user equipment (UE), and provides communication services. For example, the IAB node 104 forms a cell 111, the IAB node 106 forms a cell 112, and the IAB node 107 forms a cell 113. Similarly, another IAB node (and an IAB donor in some cases) can form a cell, establish a connection to a UE, and provide communication services. Each IAB node (and an IAB donor in some cases) can form a plurality of predetermined beams or form a proper beam for each UE and perform communication. Note that each IAB node receives data (control data and user data) addressed to a connected UE from a parent node and transmit them to the UE. Similarly, the IAB node transfers data received from the connected UE to the parent node. As a result, communication between the IAB donor functioning as a base station device and the UE is performed. Note that the IAB donor and the IAB node may provide an access line in the same frequency band as a frequency band used for a backhaul line, or provide an access line in a frequency band different from the frequency band used for the backhaul line.

An IAB node can switch a connection destination IAB donor or another IAB node. In an example, when a Backhaul Radio Link Failure (BH RLF) occurs in a radio link between an IAB node and another connection destination node, the IAB node can switch the connection destination node. For example, when a BH RLF occurs, the IAB node can search for another connectable IAB node or IAB donor, connect to it, and newly establish a communication path by IAB. Even when the radio quality of the backhaul line by IAB becomes poor for any reason, communication services can be kept provided to a connected UE. Note that the BH RLF is merely an example, and the communication path can be switched for another reason. For example, an IAB node may change the communication path in accordance with a predetermined event such as a case where the radio quality between the IAB node and another unconnected IAB node or the like becomes equal to or higher by a predetermined level than that between the IAB node and a connected parent node, like normal handover.

It is conceivable that the number of manageable UEs is limited for each IAB node based on the radio quality on a communication path up to an IAB donor connected via a parent node or the processing capability of the IAB node. For example, when the radio quality is insufficient on part of a communication path, the number of manageable UEs becomes smaller than that in the case of high radio quality. The number of manageable UEs varies depending on even the amount of physical resources such as baseband processing and RF processing. Note that the "number of manageable UEs" is a number including the total number of UEs connected to a child node and on the downstream side of the child node. That is, an upstream IAB node connected at a position close to an IAB donor on a communication path needs to relay not only communication of a UE connected to the IAB node, but also communication of a UE connected to a downstream IAB node such as a child node. Even when the number of UEs directly connected to the IAB node does not exceed a connection number allowed for the IAB node, the IAB node may not provide communication services to the UEs depending on the number of UEs connected to a downstream IAB node. In this embodiment, therefore, a control apparatus such as a control node in the IAB donor or the core network 101 decides a communication path that should be set in consideration of the allowable accommodation number of UEs in each IAB node. In the following description, the control apparatus is an IAB donor. Note that the "allowable accommodation number" at an IAB node means a maximum value of the number of UEs connected to the IAB node and the total number of UEs connected to a child node or a node on the downstream side of the child node. In an example, the allowable accommodation number may be a number at which communication cannot be performed with satisfactory quality when UEs are connected by more than the allowable accommodation number. The allowable accommodation number can be set to a number at which communication becomes immediately impossible. In addition to or instead of the allowable accommodation number, a communication path may be decided based on another criterion such as an allowable total throughput or an allowable bandwidth. That is, a communication path may be decided so that the sum of throughputs or bandwidths requested for communication of UEs connected to each IAB node and an IAB node on the downstream side of the IAB node does not exceed an allowance.

(Apparatus Configuration)

Figure 2:
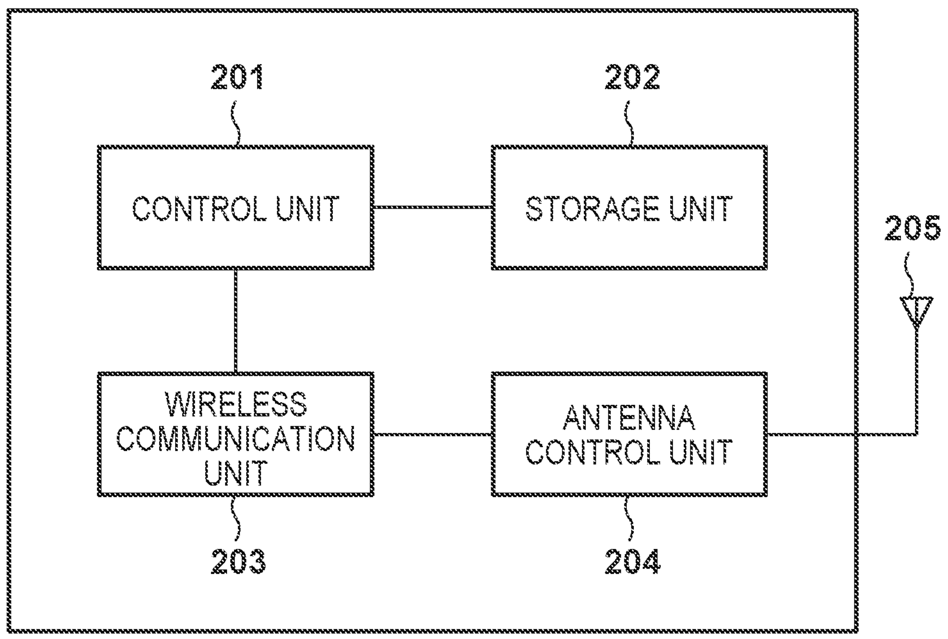
FIG. 2 is a block diagram showing an example of the hardware configuration of an IAB donor.

FIG. 2 shows an example of the hardware configuration of an IAB donor (control apparatus). The IAB donor includes, for example, a control unit 201, a storage unit 202, a wireless communication unit 203, an antenna control unit 204, and an antenna 205. Note that these components are merely an example, and the IAB donor (control apparatus) may include another hardware component or may not include at least some of the components shown in FIG. 2. The IAB donor (control apparatus) may further include components not shown in FIG. 2. For example, the IAB donor includes the wireless communication unit 203, the antenna control unit 204, and the antenna 205, but when a control apparatus arranged in the core network 101 is used, can include a wired communication unit and an interface for it, instead of these hardware components.

The control unit 201 is constituted including one or more processors such as a CPU (Central Processing Unit) and an MPU (Micro Processing Unit). Note that the control unit 201 may include a FPGA (Field Programmable Gate Array), a DSP (Digital Signal Processor), an ASIC (Application Specific Integrated Circuit), or the like. The control unit 201 can be constituted to, for example, control the overall apparatus of the IAB donor or execute processing to be described later by executing a computer program stored in the storage unit 202. The storage unit 202 is constituted including one or more of memories such as a ROM (Read Only Memory) and a RAM (Random Access Memory), and large-capacity storage devices such as a HDD (Hard Disk Drive) and a SSD (Solid State Drive). Note that these are merely an example, and the storage unit 202 can have an arbitrary device configuration capable of storing information. The storage unit 202 is constituted to, for example, store computer programs corresponding to control processing to be executed by the control unit 201 and various kinds of information (cell information, connected terminal information, IAB routing information, and the like) used in control processing.

The wireless communication unit 203 executes various processes regarding LTE (Long Term Evolution) compliant with the 3GPP standards and cellular communication such as the Fifth Generation (5G) cellular communication standards. The wireless communication unit 203 is constituted including a circuit for control processing for executing communication processing, such as a baseband chip or a RF (Radio Frequency) chip. The antenna control unit 204 controls the antenna 205 to send, as a radio signal, an electric signal generated by the wireless communication unit 203, detect a radio signal coming from outside the IAB donor, and obtain an electric signal. The antenna control unit 204 can decide, for example, an antenna weight so as to form a beam toward a connection destination partner apparatus such as an IAB node, and apply the antenna weight to a signal to be sent from the antenna 205 or a signal received by the antenna 205. The antenna 205 is constituted including one or more antenna elements designed to send a radio wave of a frequency band corresponding to a wireless communication scheme with which the wireless communication unit 203 complies, and externally receive a radio wave of the frequency band. Note that the antenna 205 can be constituted to form, by using a plurality of antenna elements, a beam whose gain becomes high in a predetermined direction and low in other directions. Note that control for forming a beam can be performed by the antenna control unit 204.

Figure 3:
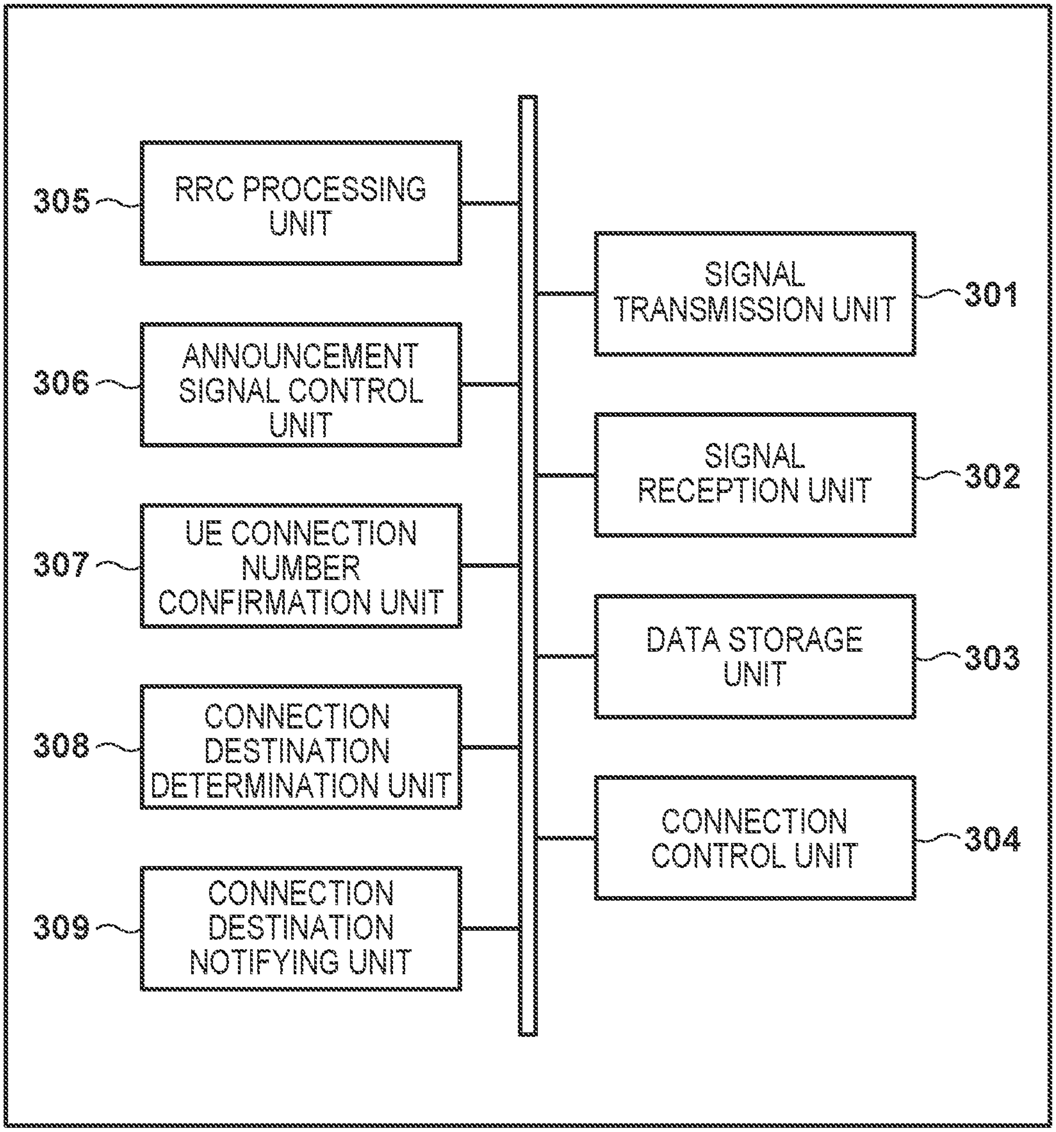
FIG. 3 is a block diagram showing an example of the functional configuration of the IAB donor.

Subsequently, an example of the functional configuration of the IAB donor (control apparatus) will be explained with reference to FIG. 3. The IAB donor (control apparatus) includes, for example, a signal transmission unit 301, a signal reception unit 302, a data storage unit 303, a connection control unit 304, a RRC processing unit 305, an announcement signal control unit 306, a UE connection number confirmation unit 307, a connection destination determination unit 308, and a connection destination notifying unit 309. Note that these functional units are merely an example, and some of these functions may be omitted or a function different from those shown in FIG. 3 may be added. Further, one functional unit integrating two or more functions shown in FIG. 3 may be prepared, or a function shown as one functional unit in FIG. 3 may be divided into a plurality of functional units. The functional units shown in FIG. 3 can be implemented by, for example, executing a program stored in the storage unit 202 by the control unit 201. At least some functions may be implemented using dedicated hardware such as a function built in advance in the wireless communication unit 203. Some functions may be implemented by cooperation between the IAB donor and the IAB node.

The signal transmission unit 301 and the signal reception unit 302 execute processing for transmitting and receiving radio signals in compliance with 3GPP LTE and cellular communication standards such as 5G between the UEs. The data storage unit 303 executes processing for storing and holding software (computer program) to be executed by an IAB donor, IAB routing information, information about a connected UE, and the like. The data storage unit 303 can store general information about communication control such as PLMN (Public Land Mobile Network Identity) serving as an identifier for identifying a communication carrier. The connection control unit 304 executes processing regarding connection and disconnection of a UE to and from a cellular network in communication of a radio resource control (RRC) message or the like performed between the UE and the core network. The RRC processing unit 305 executes RRC processing to request establishment or release of a RRC connection. When the first IAB node under the IAB donor performs handover to another IAB donor or the second IAB node under the other IAB donor, the RRC processing unit 305 can transmit a message for handover to a UE connected to the first IAB node. Also, when the first IAB node performs handover from another IAB donor or the second IAB node under the other IAB donor and is connected to the IAB donor, the RRC processing unit 305 can transmit a message for handover to a UE connected to the first IAB node. That is, when a connected IAB node connects to another IAB donor, the connection destination IAB donor is also changed for a UE connected to the IAB node, so the RRC processing unit 305 performs processing for releasing the RRC connection between the IAB donor and the UE. When an unconnected first IAB node performs handover to the IAB donor or the second IAB node under the IAB donor, the RRC processing unit 305 executes processing for establishing a RRC connection to a UE connected to the first IAB node.

For each cell provided by the IAB donor, the announcement signal control unit 306 sends an announcement signal such as a sync signal (SS) or a physical broadcast channel (PBCH) periodically to the surroundings by a predetermined frequency resource. Note that the announcement signal control unit 306 can control to, for example, decide a radio resource or the like that should be used for SS/PBCH transmission at each IAB node connected under the IAB donor, and transmit an announcement signal by the radio resource. Based on the announcement signal, the MTs of UEs and IAB nodes present in a range where the announcement signal arrives can recognize an IAB donor present near the IAB donor or an IAB node connected to the near IAB donor. Based on the received announcement signal, the MTs of UEs and IAB nodes can execute processing of connecting to a neighboring IAB donor or another IAB node.

The UE connection number confirmation unit 307 confirms the number of UEs connected to each of an IAB node connected to the IAB donor and other IAB nodes connected on the downstream side of the IAB node. In procedures for a case where a UE is connected to each IAB node, the UE connection number confirmation unit 307 can recognize an IAB node to which the UE is connected, based on, for example, the identifier of a communication path included in a signal transmitted from the IAB node. The UE connection number confirmation unit 307 can store the number of UEs connected to each IAB node in the data storage unit 303, and confirm the number of UEs connected to each IAB node based on the stored information. When establishing a connection and communication path to each IAB node, the UE connection number confirmation unit 307 can obtain an allowable accommodation number at each IAB node and store it in the data storage unit 303. In setting of establishment of a communication path, the UE connection number confirmation unit 307 can specify IAB nodes included in each communication path. For each IAB node included in a given communication path, the UE connection number confirmation unit 307 can calculate the total number of UEs connected to the IAB node and an IAB node on the downstream side of the IAB node, and determine whether the total number exceeds the allowable accommodation number.

For an IAB node included in a communication path to which a new UE is connected, when the number of UEs connected to the IAB node and another downstream IAB node exceeds the allowable accommodation number, the connection destination determination unit 308 determines the connection destination of the IAB node on the communication path. For example, the connection destination determination unit 308 can determine to switch the connection destination of the IAB node to which the UE is connected, or the connection destination of an upstream IAB node. For example, the connection destination determination unit 308 determines whether, when a new communication path is established by connecting the UE-connected IAB node to another IAB node, an IAB node at which the number of UEs exceeds the allowable accommodation number exists on the new communication path. When a new communication path on which an IAB node at which the number of UEs exceeds the allowable accommodation number does not exist can be set, the connection destination determination unit 308 can decide to change the connection destination of any IAB node so as to set the new communication path. The connection destination notifying unit 309 notifies the IAB node whose connection destination is changed, which is decided by the connection destination determination unit 308, to change the connection destination and of information representing a connection destination IAB node after change.

(Sequence of Communication Processing)

Subsequently, an example of the sequence of processing executed in the above-described wireless communication system will be explained. In the following description, attention is paid to only the IAB donor 102 and the IAB nodes 103 to 107 in the system of FIG. 1. Note that the IAB node 107 is connected to the IAB node 104, and a communication path including the IAB donor 102, the IAB node 103, the IAB node 104, and the IAB node 107 is formed. Assume that another communication path including the IAB donor 102, the IAB node 105, and the IAB node 106 is also formed.

Processing Example 1

In this processing example, a case where the number of UEs that can be accommodated in each IAB node (that is, a maximum value of the total number of UEs connected to each IAB node and another downstream IAB node) is set will be explained. In this processing example, the IAB node 104 can connect to the IAB node 105 in addition to the IAB node 103, and the IAB node 107 can connect to the IAB node 105 or the IAB node 106 in addition to the IAB node 104. The IAB node 106 can connect to the IAB node 103 in addition to the IAB node 105. As for a device to which each IAB node can connect, for example, the MT of each IAB node measures a surrounding radio environment and specifies the device in advance based on the measurement result. This can be performed similarly to conventional processing of deciding a measurement target cell with respect to a UE.

Assume that the allowable accommodation number at each IAB node is 12 at the IAB node 103, eight at the IAB node 104, 20 at the IAB node 105, 12 at the IAB node 106, and five at the IAB node 107. Further, assume that the number of UEs connected in the cell 111 formed by the IAB node 104 is four, and that of UEs connected in the cell 112 formed by the IAB node 106 is six. Assume that the number of UEs connected in the cell 113 formed by the IAB node 107 is four, and a UE 121 tries further to connect. At the IAB node 104, the number of UEs connected to the IAB node 104 is four, the number of UEs connected to the IAB node 107 connected on the downstream side is also four, and the total number of UEs accommodated in the IAB node 104 is eight. At the IAB node 107, there is no other IAB node connected on the downstream side, and accommodated UEs are only four UEs connected to the IAB node 107. FIG. 4 is a table collectively showing these pieces of information.

If the additional UE 121 connects to the IAB node 107, the number of UEs accommodated in the IAB node 103 and the IAB node 104 becomes nine, and that of UEs accommodated in the IAB node 107 becomes five. In this case, the number of accommodated UEs does not exceed the allowable accommodation number at the IAB node 107, but that of accommodated UEs exceeds the allowable accommodation number at the IAB node 104. Thus, the IAB donor 102 can determine whether to switch the connection destination of the IAB node 107. That is, since the number of accommodated UEs exceeds the allowable accommodation number at the IAB node 104, it is determined whether to change the connection destination of the child node of the IAB node 104 or an IAB node (here, the IAB node 107) connected on the downstream side of the child node. In this processing example, it is determined whether to change the connection of the IAB node 107 to either of the IAB node 106 and IAB node 105 serving as connection destination candidates other than the currently connected IAB node 104. In FIG. 4, the allowable accommodation number of the IAB node 106 is 12, and the number of currently accommodated UEs is six. If the IAB node 107 to which the UE 121 is connected connects to the IAB node 106, the number of UEs connected to the IAB node 107 at that point is five, and thus the number of UEs accommodated in the IAB node 106 becomes 11, which falls within the range of the allowable accommodation number. The allowable accommodation number of the IAB node 105 is 20, and the number of currently accommodated UEs is six. Even if the IAB node 107 connects to the IAB node 106, the number of accommodated UEs falls within the range of the allowable accommodation number. Similarly, even if the IAB node 107 connects to the IAB node 105, the number of accommodated UEs falls within the range of the allowable accommodation number. From this, the IAB donor 102 can decide to switch the connection destination of the IAB node 107 to the IAB node 106 or the IAB node 105.

In a case where, for example, the IAB node 107 copes with Dual Connectivity, the IAB donor 102 may decide to add a connection destination, instead of switching the connection destination of the IAB node 107. That is, the IAB donor 102 may decide a connection to the IAB node 106 or the IAB node 105 while the IAB node 107 maintains the connection to the IAB node 104. In this case, the IAB donor 102 can decide which of a path 1 via the IAB node 104 and a path 2 via the IAB node 106 or the IAB node 105 is used for communication for each UE connected to the IAB node 107. Note that this is merely an example, and the UE and the path may not be associated statically. For example, a predetermined ratio of communication of UEs connected to the IAB node 107 may be performed using the path 2. For example, the IAB donor 102 may decide to perform communication of three UEs on the path 1 and communication of two UEs on the path 2, and share the setting information with the IAB node 107. In this case, for example, it is possible to add three to the number of UEs accommodated in the IAB node 104 and two to that of UEs accommodated in the IAB node 106 or the IAB node 105.

Figure 5:
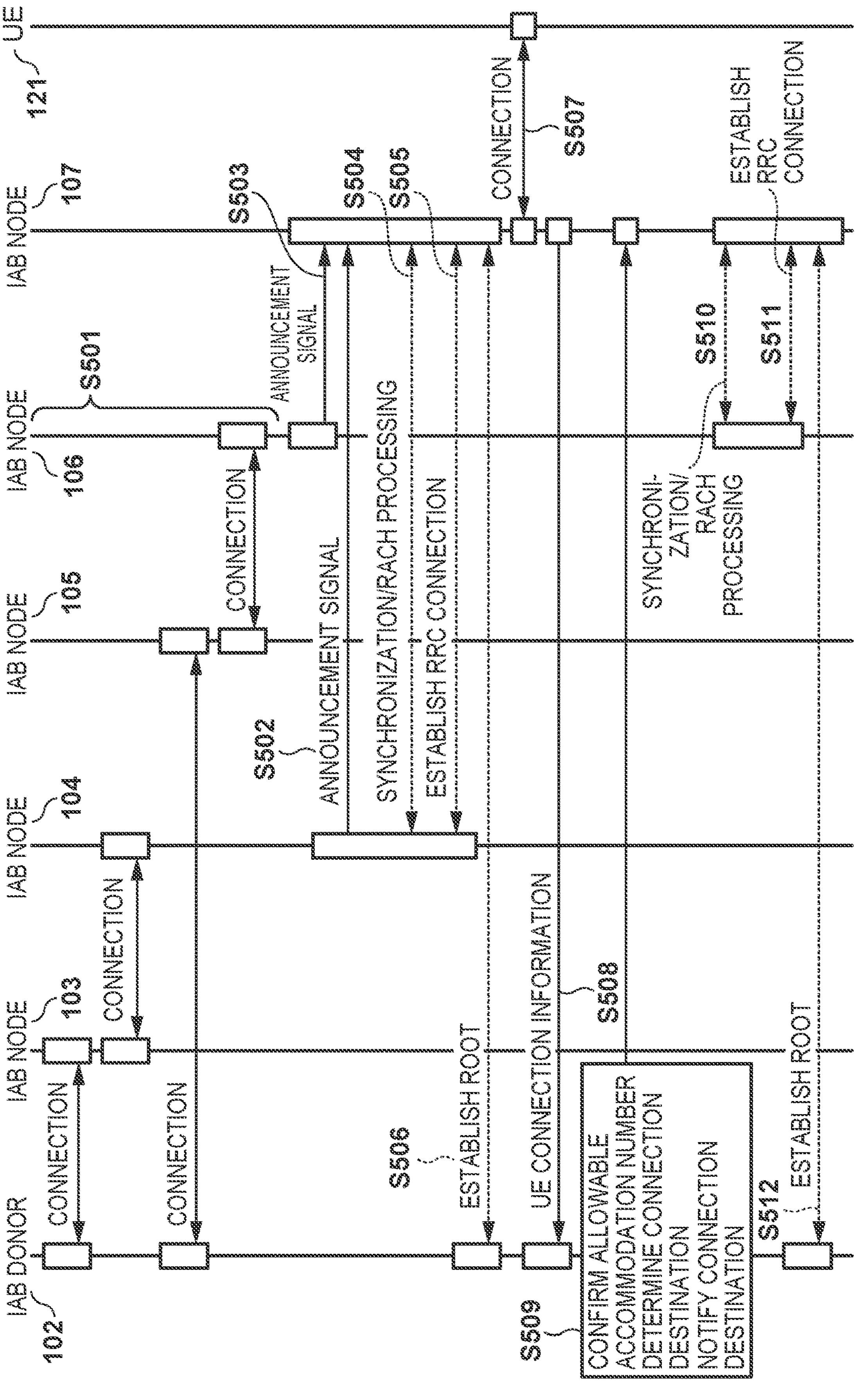
FIG. 5 is a chart showing an example of the sequence of processing executed in the wireless communication system.

An example of the sequence of processing in the wireless communication system will be described with reference to FIG. 5. For descriptive convenience, assume that the IAB node 107 is connectable to either the IAB node 104 or the IAB node 106, and a connection to the IAB node 105 is not considered. First, the first communication path starting from the IAB donor 102 and including the IAB donor 102, the IAB node 103, and the IAB node 104, and the second communication path starting from the IAB donor 102 and including the IAB donor 102, the IAB node 105, and the IAB node 106 are formed (S501). For the first communication path, establishment of a connection and setting of a communication path between the IAB donor 102 and the IAB node 103, and establishment of a connection and setting of a communication path between the IAB node 103 and the IAB node 104 are performed. For the second communication path, establishment of a connection and setting of a communication path between the IAB donor 102 and the IAB node 105, and establishment of a connection and setting of a communication path between the IAB node 105 and the IAB node 106 are performed. In a state in which the first and second communication paths are formed in this manner, the IAB node 107 further connects to the IAB node 104 in order to connect to the first communication path. The IAB node 107 receives, for example, announcement signals (sync signals and physical broadcast channels SS/PBCH) coming from the IAB node 104 and the IAB node 106 (S502 and S503).

The IAB node 107 establishes synchronization of a downlink based on the sync signal, and obtains basic information of the system based on the PBCH. Assume that the IAB node 107 decides to connect to the IAB node 104 based on the reception intensity of the announcement signal or the like. In this case, the IAB node 107 executes a random access procedure (RACH processing) between the IAB node 107 and the IAB node 104 (S504). That is, the IAB node 107 transmits a random access preamble to the IAB node and receives a random access response including information that designates a transmission timing, thereby establishing synchronization of an uplink. Then, the IAB node 107 establishes a connection in the RRC layer (S505), and changes to a state in which the IAB node 107 can communicate with the IAB node 104. The IAB node 107 executes setting processing of a communication path by BAP between the IAB node 107 and the IAB donor 102, thereby establishing a communication path on which the IAB donor 102, the IAB node 103, the IAB node 104, and the IAB node 107 are connected in this order (S506). Note that detailed procedures of establishment of a connection and setting of a communication path are the same as general procedures of establishment of a connection and setting of a communication path at an IAB node, and a description thereof will be omitted. Upon completion of the setting, the IAB donor 102 can manage the communication path including the IAB node 107. By the setting, the IAB node 107 can function as a relay device that relays communication of the IAB donor 102, and can establish a connection to a UE.

For example, after four UEs are connected to the IAB node 107, the UE 121 enters the cell 113 formed by the IAB node 107 and establishes a connection to the IAB node 107 (S507). When actually establishing a connection, the UE 121 executes connection processing between the UE 121 and the IAB donor 102 via the IAB node 107. At this time, the IAB node 107 transfers data including identification information for identifying the communication path between the IAB node 107 and the IAB donor 102. From this, the IAB donor 102 can recognize that the UE 121 connects to the IAB node 107. The IAB donor 102 determines whether the communication path currently associated with the IAB node 107 includes an IAB node at which the number of accommodated UEs exceeds the allowable accommodation number upon connection of the UE 121. If there is the first IAB node at which the number of accommodated UEs exceeds the allowable accommodation number, the IAB donor 102 determines to switch the connection destination of the second IAB node on the downstream side of the IAB node. The IAB donor 102 decides the IAB node 106 as the connection destination of the IAB node 107 in, for example, the above-described way, and transmits a connection destination switching instruction including information of the connection destination to the IAB node 107 (S509). Note that the information of the connection destination can be, for example, the identifier of a cell formed by the IAB node 106.

Upon receiving the connection destination switching instruction from the IAB donor 102, the IAB node 107 executes RACH processing between the IAB node 107 and the IAB node 106 based on the instruction to establish synchronization (S510) and establish a RRC connection (S511). At this time, the IAB node 107 can cancel the connection to the IAB node 104. That is, the MT of the IAB node 107 can execute handover to switch the connection destination IAB node. After that, the IAB node 107 executes setting processing of a communication path by BAP between the IAB node 107 and the IAB donor 102, thereby establishing a communication path on which the IAB donor 102, the IAB node 105, the IAB node 106, and the IAB node 107 are connected in this order (S512). By performing such processing, an IAB node that accommodates UEs more than the allowable accommodation number is canceled. This can prevent degradation of the communication quality caused by an overload at some IAB nodes.

In the above-described example, whether to change the connection destination of the IAB node 107 has been described. In a case where, for example, the IAB node 107 copes with Dual Connectivity, a connection destination may be added. That is, as for an IAB node that can connect to two or more connection destinations in parallel, the connection destination may be changed or a connection destination may be added.

Figure 6A:
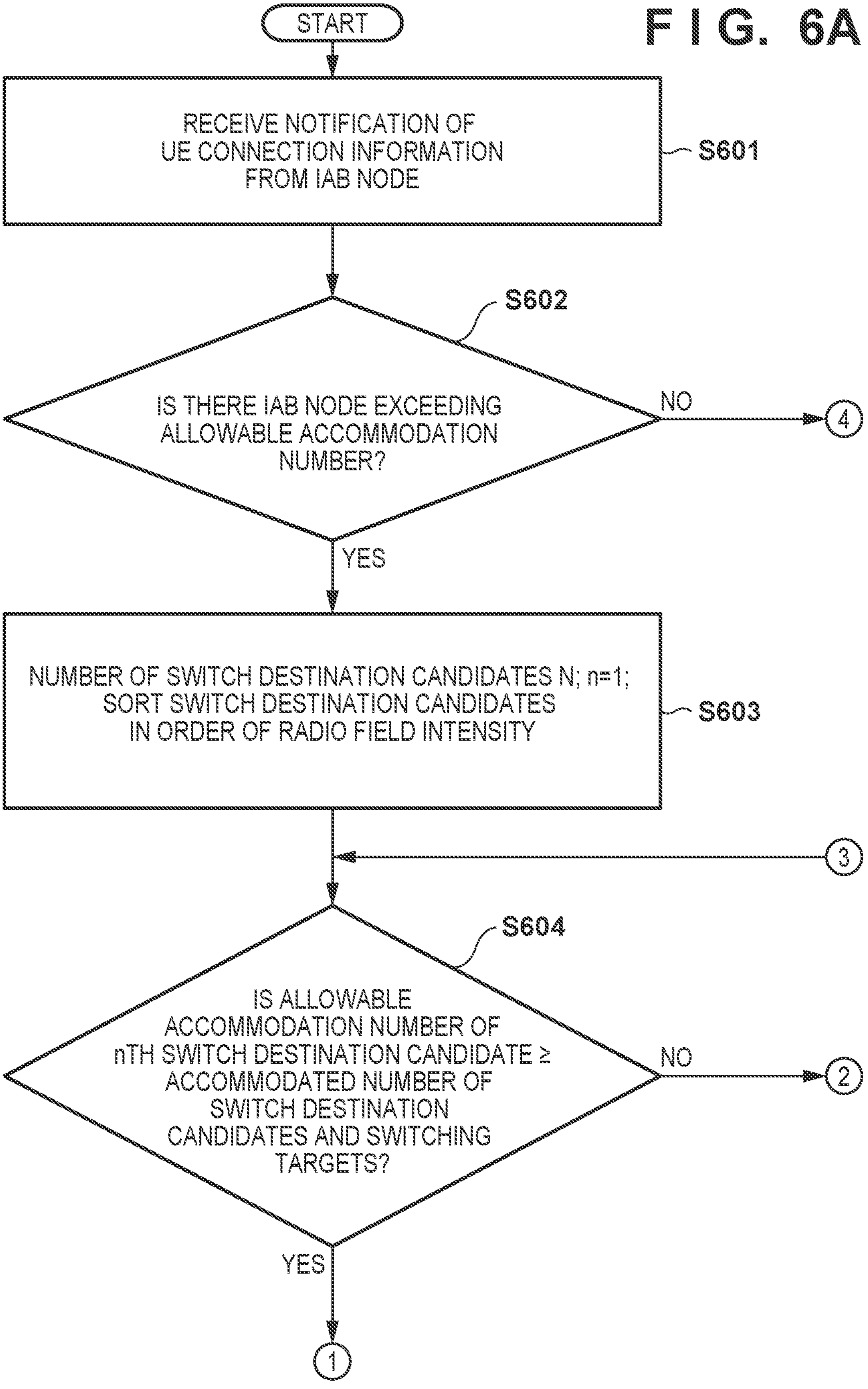
FIG. 6A is a flowchart showing an example of the sequence of processing executed by the IAB donor.
Figure 6B:
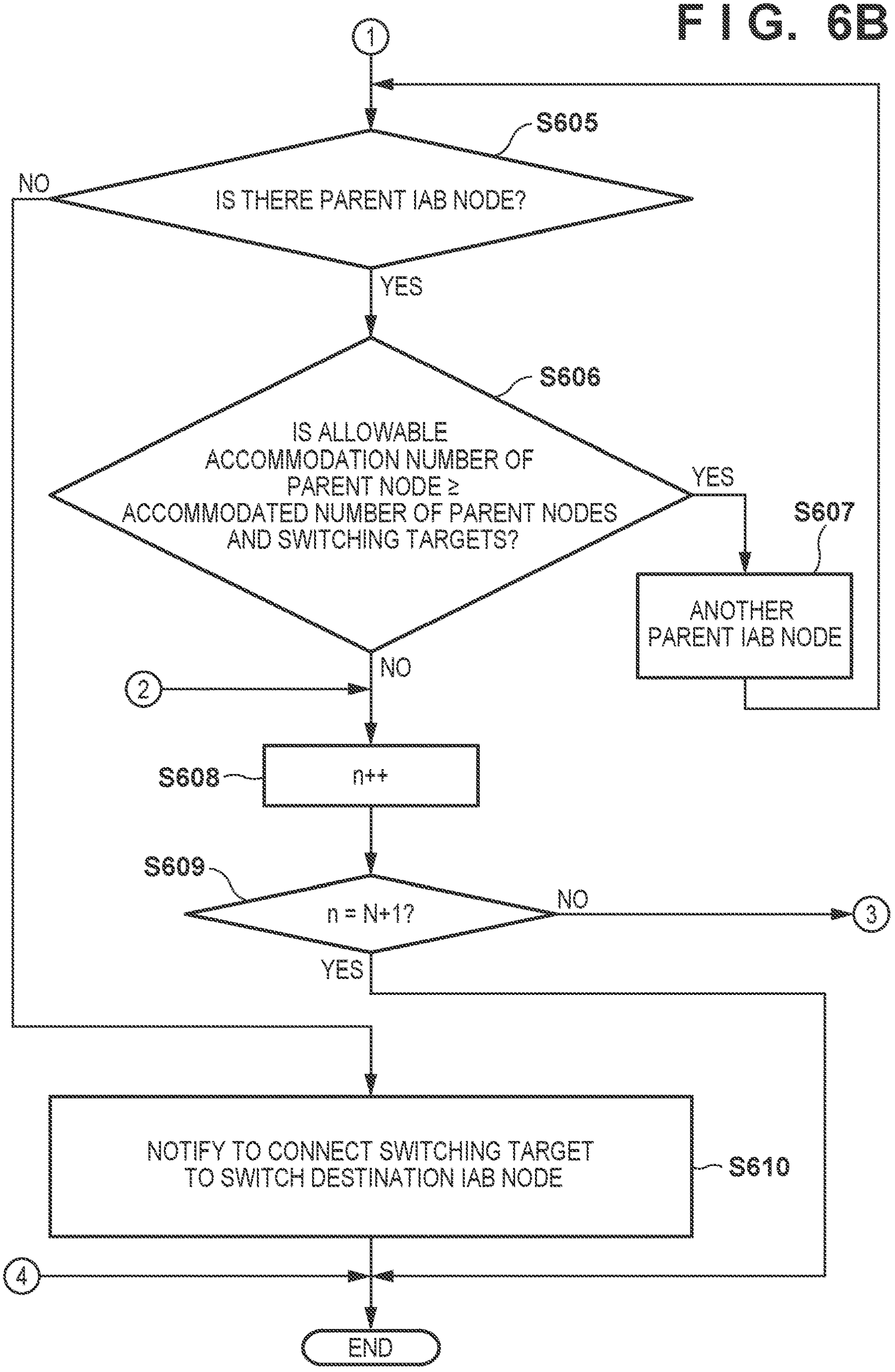
FIG. 6B is a flowchart showing the example of the sequence of processing executed by the IAB donor.

Next, the sequence of processing executed by the IAB donor 102 in S509 will be described with reference to FIGS. 6A and 6B. The processing in FIGS. 6A and 6B can be implemented by, for example, executing a program stored in the storage unit 202 by the control unit 201 of the IAB donor 102. Note that this is merely an example, and predetermined hardware implementing the processing in FIGS. 6A and 6B may be used.

When connecting to the UE 121 via the IAB node 107, the IAB donor 102 receives UE connection information representing that the UE 121 is connected to the IAB node 107 (step S601). When the UE 121 is connected to the IAB node 107, the IAB donor 102 determines whether an IAB node accommodating UEs more than the allowable accommodation number exists among IAB nodes included in a communication path to which the IAB node 107 belongs (step S602). If such an IAB node does not exist (NO in step S602), the IAB donor 102 ends the processing, accepts connection of the UE 121 using the current communication path, and communicates with the UE 121 via the IAB node 107. If such an IAB node exists (YES in step S602), the IAB donor 102 executes initial setting for processing of selecting the switching destination of the connection destination (step S603). In the initial setting, as for the IAB node whose connection destination is changed, the number of connection switching destination candidates is represented by "N", the connection switching destination candidates are sorted in the order of radio field intensity (radio quality), and the following processing is executed from n=first candidate. Here, the connection switching destination candidate of the IAB node 107 is only the IAB node 106. That is, according to the information in FIG. 4, the IAB node 107 can connect to the IAB node 104 and the IAB node 106 and now connects to the IAB node 104 out of them. For this reason, the connection switching destination candidate after change is only the IAB node 106. Thus, as for a case where N=1 is set and the connection destination of the IAB node 107 is changed to the IAB node 106, it is determined whether all UEs can be accommodated on a communication path between the IAB node 107 and the IAB donor 102.

Note that an IAB node whose connection destination is changed can be the IAB node 107 to which the UE 121 connects, but can be the child IAB node of an IAB node accommodating UEs more than the allowable accommodation number, or an IAB node on the downstream side of the child IAB node. In this case, when a plurality of IAB nodes exist as candidates whose connection destination is changed, the processing in step S603 and subsequent steps can be executed for each of the IAB nodes to decide an IAB node whose connection destination is switched. As an example, it can be decided to preferentially switch the connection destination of a downstream IAB node.

In step S604, as for the IAB node 107, the IAB donor 102 determines whether the allowable accommodation number of an IAB node serving as the nth connection switching destination candidate exceeds the allowable accommodation number upon switching the connection destination of the IAB node 107. That is, the IAB donor 102 determines whether the allowable accommodation number of the switching destination candidate is equal to or larger than a value obtained by adding the number of currently accommodated UEs of the IAB node 107 to the number of currently accommodated UEs of the switching destination candidate (step S604). If UEs more than the allowable accommodation number are to be accommodated (NO in step S604), the IAB donor 102 decides not to connect the IAB node 107 to the switching destination candidate. Then, the IAB donor 102 increments the parameter n and shifts to processing regarding the next switching destination candidate (step S608). At this time, if the parameter n exceeds the number N of switching destination candidates and the next switching destination candidate does not exist (YES in step S609), the IAB donor 102 ends the processing. If the next switching destination candidate exists (NO in step S609), the IAB donor 102 returns the processing to step S604 and performs the above-described determination processing. If it is determined in step S609 that the next switching destination candidate does not exist, the connection switching destination of the IAB node 107 is not changed, and the state in which the number of accommodated UEs of the IAB node 104 exceeds the allowable accommodation number is maintained. To prevent this, the IAB donor 102 may hand over a UE connected to the IAB node 104 or the IAB node 107 to another IAB node so the number of accommodated UEs of the IAB node 104 does not exceed the allowable accommodation number. In such a case, UEs connected to the IAB node 104 or the IAB node 107 may be notified that UEs exceeding the allowable accommodation number are accommodated on the current communication path.

If the number of UEs accommodated in a switching destination candidate does not exceed the allowable accommodation number upon switching the connection destination of the IAB node 107 (YES in step S604), the IAB donor 102 performs similar processing even for the parent node of the candidate. First, the IAB donor 102 determines whether a parent node exists for the connection switching destination candidate of the IAB node 107 (step S605). If no parent node exists for the connection switching destination candidate, an IAB node at which the number of accommodated UEs exceeds the allowable accommodation number does not exist on a communication path after change even upon changing the connection destination of the IAB node 107 to the switching destination candidate. Thus, the IAB donor 102 notifies the IAB node 107 to connect to the IAB node serving as the switching destination candidate (step S610), and ends the processing. In accordance with the notification, the IAB node 107 changes the connection destination. On the other hand, if a parent node exists for the switching destination candidate (YES in step S605), the IAB donor 102 determines whether the number of accommodated UEs at the parent node exceeds the allowable accommodation number upon connecting the IAB node 107 to the candidate (step S606). If the number of accommodated UEs at the parent node does not exceed the allowable accommodation number (YES in step S606), the IAB donor 102 performs similar determination for the parent node of the parent node (step S607). By repeating this procedure, it can be confirmed that the number of accommodated UEs does not exceed the allowable accommodation number at all IAB nodes included in a communication path to which the connection switching destination candidate of the IAB node 107 belongs. If the number of accommodated UEs of any IAB node in the communication path exceeds the allowable accommodation number upon connecting the IAB node 107 to the switching destination candidate (NO in step S606), the IAB donor 102 determines not to connect the IAB node 107 to the candidate. In this case, the IAB donor 102 changes the connection switching destination candidate (step S608), and repeats processing similar to the above-described processing.

For example, the connection switching destination candidate of the IAB node 107 is the IAB node 106. In FIG. 4, the number of accommodated UEs of the IAB node 106 is six before connecting the IAB node 107. When the IAB node 107 connects to the IAB node 106, the IAB node 106 accommodates even five UEs connected to the IAB node 107, and the number of accommodated UEs becomes 11. Since the number of accommodated UEs does not exceed the allowable accommodation number "12" of the IAB node 106 (YES in step S604), processing for the IAB node 105 serving as the parent node of the IAB node 106 is executed (step S606). The number of UEs currently accommodated in the IAB node 105 is six, and when the IAB node 107 connects to the IAB node 106, the number of accommodated UEs becomes 11. The number of accommodated UEs does not exceed the allowable accommodation number "20" of the IAB node 105 (YES in step S606). The IAB node 105 is connected to the IAB donor 102, and no parent IAB node exists (NO in step S605). Hence, it can be confirmed that even if the IAB node 107 connects to the IAB node 106, the number of accommodated UEs does not exceed the allowable accommodation number at all IAB nodes included in the communication path after the connection. The IAB donor 102 can decide to switch the connection destination of the IAB node 107 from the IAB node 104 to the IAB node 106.

Note that the IAB donor 102 may decide to connect the IAB node 107 to the IAB node 106 while maintaining the connection to the IAB node 104. The IAB donor 102 can designate some UEs to perform communication of the UEs via the IAB node 106. The IAB donor 102 may control to perform part of communication of the IAB node 107 via the IAB node 106 without designating a UE. In this case, the IAB donor 102 may transmit an instruction to the IAB node 107 to transfer communication of some UEs to the IAB node 106 in uplink communication.

In this fashion, the IAB donor 102 can consider the allowable accommodation number of UEs set for each IAB node and properly set a communication path based on the relationship between the allowable accommodation number and the number of currently accommodated UEs. This can suppress an excessive increase in communication processing load caused by an increase in UEs connected to an IAB node. Communication services can be provided to UEs using a communication path in a satisfactory communication environment.

Processing Example 2

In processing example 1, a case where the allowable accommodation number of UEs is set in advance individually for each IAB node has been described. In processing example 2, the sequence of processing when the allowable accommodation number of each IAB node is set in accordance with the number of hops from an IAB donor will be explained. That is, in this processing example, the allowable accommodation number of each IAB node is not set in advance, and the allowable accommodation number is decided in accordance with the number of hops from an IAB donor upon establishing a communication path. Note that the number of hops is counted such that an IAB node directly connected to an IAB donor has one hop, and an IAB node connected to another IAB node connected by one hop has two hops. In this processing example, it is set that the allowable accommodation number becomes smaller as the number of hops becomes larger. That is, the allowable accommodation number becomes larger for an IAB node connected at a position closer to an IAB donor on a communication path. This is because at an IAB node farthest from an IAB donor, only communication processing of UEs directly connected to the IAB node is performed, but at an IAB node closer to the IAB donor, even communication processing of UEs connected to a downstream IAB node needs to be performed. When the allowable accommodation number is decided in this manner, an IAB node can connect to a more upstream IAB node or an IAB donor to increase the allowable accommodation number. For example, at a given IAB node, when the number of UEs accommodated in the IAB node exceeds the allowable accommodation number, the connection destination is switched to a more upstream IAB node or an IAB donor so that the number of accommodated UEs can become equal to or smaller than the allowable accommodation number.

FIG. 7 shows the relationship between the number of hops and the allowable accommodation number. The allowable accommodation number of the first IAB node wirelessly-connected to an IAB donor is set to be 12, and that of the second IAB node wirelessly-connected to the first IAB node is set to be eight. The allowable accommodation number of the third IAB node wirelessly-connected to the second IAB node is set to be 4. In the example of FIG. 1, the allowable accommodation numbers of the IAB node 103 and IAB node 105 directly connected to the IAB donor 102 are set to be 12, and those of the IAB node 104 and IAB node 106 respectively connected to these IAB nodes are set to be eight. Since the IAB node 107 is connected to the IAB node 104, the allowable accommodation number is set to be four.

Assume that four UEs are connected to the IAB node 104, six UEs are connected to the IAB node 106, four UEs are connected to the IAB node 107, and the UE 121 is newly connected to the IAB node 107, as shown in FIG. 1. When the IAB node 107 currently connects to the IAB node 104, the number of accommodated UEs exceeds the allowable accommodation number upon connecting the UE 121 because the allowable accommodation number is four. In such a case, according to this processing example, the IAB node 107 switches the connection destination to, for example, the IAB node 105. When the IAB node 107 directly connects to the IAB node 105, the number of hops up to the IAB donor 102 becomes two, and the allowable accommodation number can be increased to eight. As a result, even if the number of connected UEs of the IAB node 107 is increased upon connecting the UE 121, the number of accommodated UEs can be suppressed to be equal to or smaller than the allowable accommodation number.

Figure 8A:
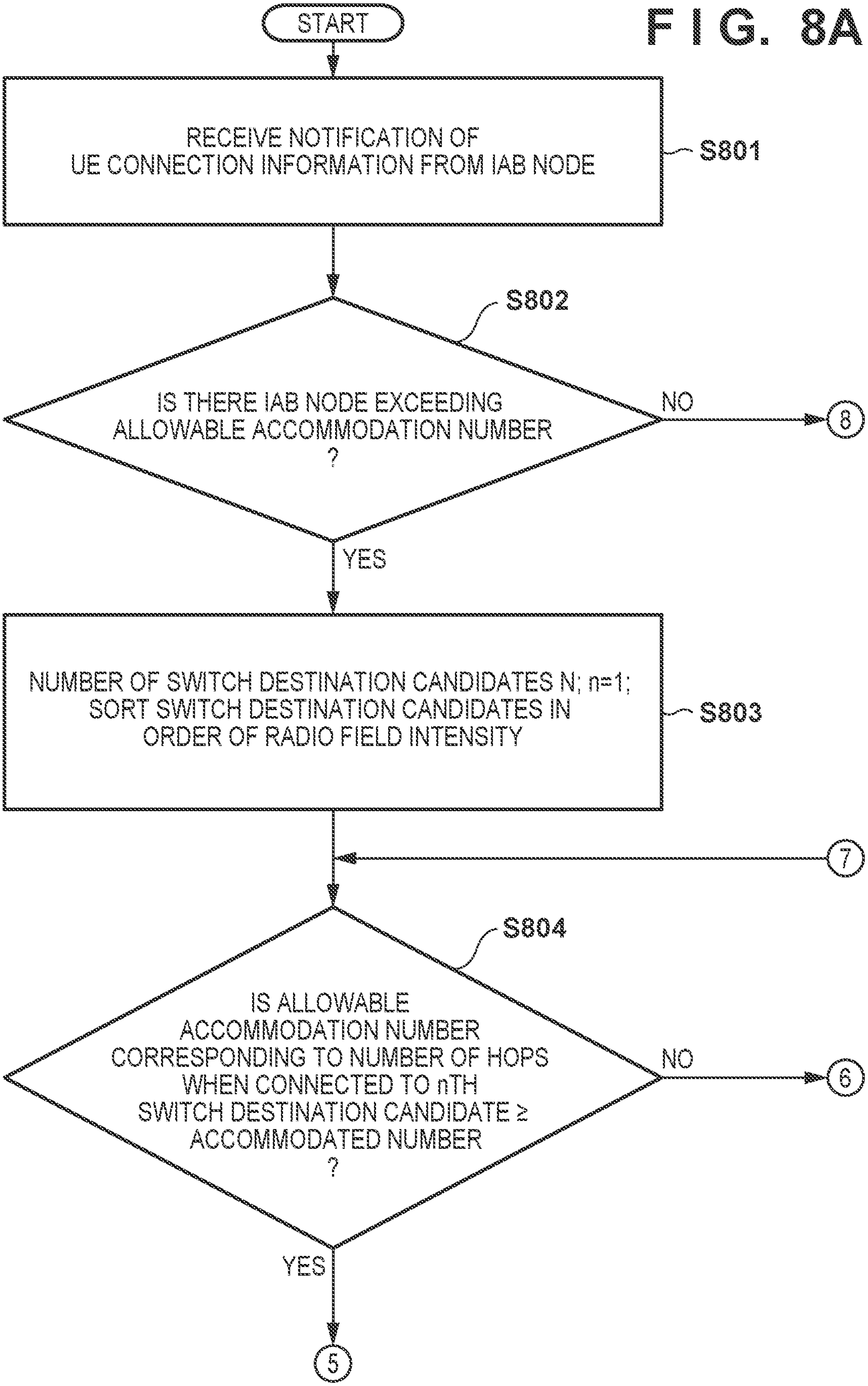
FIG. 8A is a flowchart showing an example of the sequence of processing executed by the IAB donor.
Figure 8B:
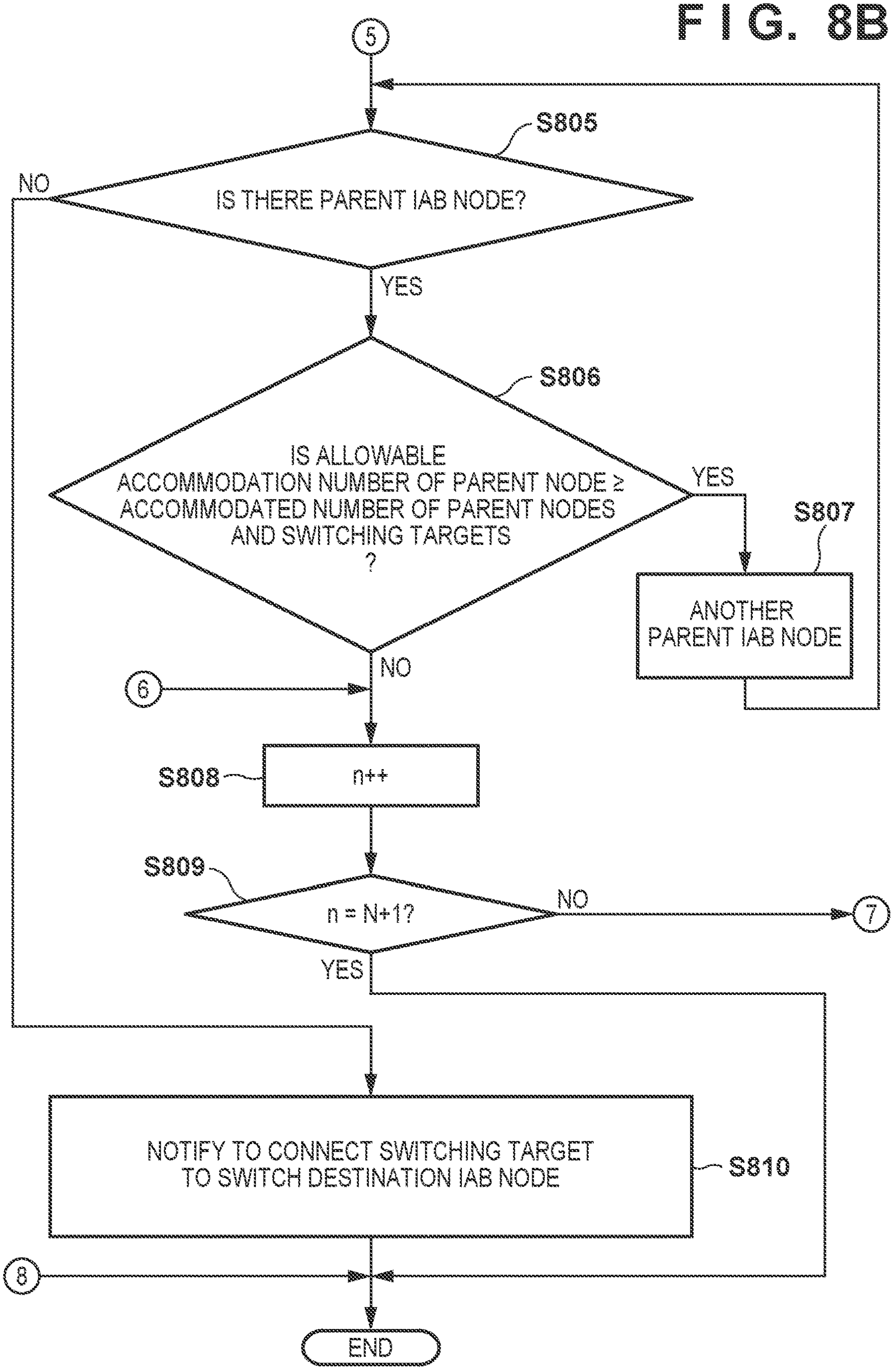
FIG. 8B is a flowchart showing the example of the sequence of processing executed by the IAB donor.

An example of the sequence of processing in this case will be described with reference to FIGS. 8A and 8B. Even the processing in FIGS. 8A and 8B can be implemented by, for example, executing a program stored in the storage unit 202 by the control unit 201 of the IAB donor 102, similar to the processing in FIGS. 6A and 6B. Note that this is merely an example, and predetermined hardware implementing the processing in FIGS. 8A and 8B may be used. Steps S801 to S803 are similar to steps S601 to S603 of FIG. 6A.

In step S804, the IAB donor 102 specifies the allowable accommodation number of UEs when an IAB node whose connection destination is switched connects to the nth connection switching destination candidate, and determines whether the number of currently accommodated UEs is equal to or smaller than the allowable accommodation number. For example, the IAB donor 102 manages information representing the connection manner of each IAB node and an established communication path. The IAB donor 102 can therefore specify, as the allowable accommodation number of the IAB node 107 after switching the connection destination, an allowable accommodation number corresponding to the number of hops obtained by adding one to the number of hops of the connection switching destination candidate of the IAB node 107 from the IAB donor 102. Here, the IAB node 105 and the IAB node 106 exist as connection switching destination candidates of the IAB node 107 connected to the IAB node 104. When the IAB node 107 is connected to the IAB node 106, the number of hops does not change before and after switching the connection destination. Hence, the IAB donor 102 can determine that the IAB node 106 is not appropriate as the connection switching destination of the IAB node 107. To the contrary, when the IAB node 107 is connected to the IAB node 105, the number of hops is decreased by one from that before switching the connection, and the IAB donor 102 can specify that the allowable accommodation number is increased. Since the number (five) of UEs accommodated in the IAB node 107 does not exceed the allowable accommodation number (eight) upon switching the connection destination to the IAB node 105, the IAB donor 102 can determine that the IAB node 105 is appropriate as the connection switching destination. In this fashion, the IAB donor 102 specifies another appropriate IAB node as the connection switching destination of the IAB node 107 in step S804.

In the above-described way, the IAB donor 102 determines that the IAB node 105 is appropriate as the connection switching destination candidate (YES in step S804). In this case, the IAB donor 102 subsequently determines whether the number of UEs accommodated in the candidate IAB node 105 exceeds the allowable accommodation number upon connecting the IAB node 107 (step S806). This determination is repeated for IAB nodes on the upstream side of the IAB node determined to be appropriate as a candidate in step S804. If an IAB node that accommodates UEs more than the allowable accommodation number does not exist on a communication path upon switching the connection of the IAB node 107, the IAB donor 102 can decide to connect the IAB node 107 to the candidate IAB node. Note that the processing in steps S805 to S810 is similar to that in steps S605 to S610 of FIG. 6B.

In this fashion, the IAB donor 102 can set a communication path so as to accommodate UEs not exceeding the allowable accommodation number corresponding to the number of hops of an IAB node. This can suppress an excessive increase in communication processing load caused by an increase in UEs connected to an IAB node. Communication services can be provided to UEs using a communication path in a satisfactory communication environment. Note that in the above-described example, the connection switching destination of the IAB node 107 is the IAB node 105. However, when the IAB node 107 can connect to the IAB node 103, the connection switching destination may be the IAB node 103. Even in this case, the number of hops of the IAB node 107 changes from three to two, and the number of UEs accommodated in the IAB node 107 can become equal to or smaller than the allowable accommodation number. In an example, when the IAB node 104 can connect to the IAB donor 102, the connection destination of the IAB node 104 may be switched to the IAB donor 102 in response to accommodation of UEs exceeding the allowable accommodation number at the IAB node 107.

Note that the allowable accommodation number in this processing example may be set statically as in FIG. 7 or dynamically. For example, assume that the allowable accommodation number of the first IAB node directly connected to an IAB donor is set to be M1, and the number of UEs assumed to be connected to each IAB node is set to be L. When the number of second IAB nodes directly connected to the first IAB node is K1, the allowable accommodation number M2 of the second IAB node can be calculated by (M1−L)/K1. When the number of third IAB nodes directly connected to the second IAB node is K2, the allowable accommodation number M3 of the third IAB node can be calculated by (M2−L)/K2. For example, assume that the allowable accommodation number of the first IAB node is 30, and the number of UEs assumed to be directly connected to each IAB node is six. When the number of second IAB nodes directly connected to the first IAB node is one, the allowable accommodation number of the second IAB node is (30−6)/1=24. When the number of second IAB nodes is two, the allowable accommodation number of the second IAB node is (30−6)/2=12. When the number of second IAB nodes is three, the allowable accommodation number of the second IAB node is (30−6)/3=8. Note that an IAB donor may set the allowable accommodation number of each IAB node in accordance with the total number of IAB nodes connected under a directly connected IAB node. For example, assume that K1 second IAB nodes directly connected to the first IAB node and K2 third IAB nodes directly connected to the second IAB nodes exist on the downstream side of the first IAB node directly connected to an IAB donor. In this case, a value P1=M1/(K1+K2) as a result of dividing the allowable accommodation number of the first IAB node by (K1+K2) can be calculated as the number of UEs to be directly connected to each IAB node. The value P1 is an allowable accommodation number at the third IAB node. When K2 third IAB nodes are connected to the second IAB node, the allowable accommodation number of the second IAB node is (K2+1) □ P1. This is a value obtained by adding P1 UEs directly connected to the second IAB node to the number K2 □ P1 of UEs that should be accommodated via the third IAB nodes. In this manner, the allowable accommodation number may be set in advance statically or dynamically based on various criteria.

When the allowable accommodation number is dynamically decided, the allowable accommodation number of each IAB node at a connection destination after changing the connection destination of the IAB node 107 can be changed upon the change. Hence, the connection destination of the IAB node 107 can be decided so that an IAB node at which the number of UEs exceeds the allowable accommodation number upon the change does not exist.

In each processing example described above, when the number of UEs to be accommodated in any of IAB nodes included in a communication path upon changing the connection destination of the IAB node 107 exceeds the allowable accommodation number, the IAB node 107 is not connected to the communication path. However, for example, after changing the connection destination of the IAB node 107, the connection destination of another IAB node included in a communication path at the connection destination upon the change may be changed so that the number of accommodated UEs of each IAB node within the communication path does not exceed the allowable accommodation number. Also, for example, when another IAB node is connected as the child node of the IAB node 104 to which the IAB node 107 connects, whether to change the connection destination of the other IAB node may be determined in the above-described way.

In the above-described processing example, a case where the allowable accommodation number is set individually for each IAB node or in accordance with the number of hops on the communication path of each IAB node has been described. However, the present invention is not limited to this. For example, the allowable accommodation number may be set for each communication path. For example, an allowable accommodation number for a communication path including the IAB node 103, the IAB node 104, and the IAB node 107, and an allowable accommodation number for a communication path including the IAB node 105 and the IAB node 106 can be set in the configuration of FIG. 1. When a UE is newly connected to any IAB node, it is determined whether the number of UEs accommodated in the communication path including the IAB node exceeds an allowable accommodation number set for the communication path. If the number of accommodated UEs exceeds the allowable accommodation number, the IAB donor 102 can specify the second IAB node serving as the connection switching destination of the first IAB node to which the UE is newly connected, and instruct the first IAB node to connect to the second IAB node. Note that when the IAB donor 102 instructs any IAB node to switch the connection destination, it updates information about the communication path that is managed in the IAB donor 102.

In the above-described processing example, before the IAB node 107 switches the connection destination, the IAB node 107 assumes a case where the connection is switched, and confirms that the number of UEs accommodated in each IAB node does not exceed the allowable accommodation number. However, the present invention is not limited to this. For example, after the IAB node 107 switches the connection destination, it may be confirmed that the number of UEs accommodated in each IAB node does not exceed the allowable accommodation number. After switching, information of the child node of the connection destination IAB node is changed. An IAB donor receives the connection information update notification, and can execute determination processing of whether the number of accommodated UEs exceeds the allowable accommodation number at each IAB node. When the number of accommodated UEs exceeds the allowable accommodation number, switching processing of the connection destinations of at least some IAB nodes can be executed.

In the above description, the allowable accommodation number and the number of accommodated UEs on a communication path starting from an IAB node directly connected to an IAB donor are considered for the IAB donor without considering the allowable accommodation number and the number of accommodated UEs. In contrast, for example, the DU (Distributed Unit) of an IAB donor may be handled as an IAB node directly connected to the IAB donor in the above description. That is, the CU (Central Unit) of an IAB donor may be handled as a base station, and the DU of the IAB donor may be handled as an IAB node directly connected to the IAB donor. In an example, the IAB node 103 or the IAB node 105 in FIG. 1 may be constituted by the DU of the IAB donor.

As described above, according to this embodiment, a communication path can be set in an IAB relay communication system so as to prevent the load of each relay device (IAB node) from exceeding the maximum value of an allowable load in the relay device and excessively increasing. Communication between a base station (IAB donor) or a core network, and user equipment (UE) can be relayed in a sufficiently good environment. Although the IAB relay communication system has been described in the above embodiment, the above discussions are applicable to a wireless relay communication system in which communication between a base station and user equipment is wirelessly relayed by a relay device. For example, the above discussions are applicable to relay of communication between an access point and a station in a wireless LAN (Local Area Network). The above discussions are applicable to the Fifth Generation (5G) cellular communication system and may also be applied to long term evolution (LTE) or a cellular communication system of a generation after 5G.

According to the present invention, a communication path for relaying communication of a UE can be properly set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An IAB donor in a wireless communication system using an Integrated Access and Backhaul (IAB) technique defined by the Third Generation Partnership Project (3GPP), the wireless communication system including at least one IAB node configured to relay communication between a core network and equipment, and an IAB donor configured to relay communication between at least one IAB node under the IAB donor and the core network, the IAB donor comprising:

one or more processors; and one or more memories that store computer-readable instructions for causing, when executed by the one or more processors, the one or more processors to execute operations including:

specifying, based at least on communication with each of the IAB nodes under the IAB donor, a respective number of equipments that are connected to each of the IAB nodes under the IAB donor;

determining, based on a number of equipments connected on a first communication path including the IAB donor, a first IAB node connected on a downstream side of the IAB donor, and a second IAB node connected to the first IAB node on a downstream side of the first IAB node, whether to change a communication path, wherein an allowable accommodation number of equipments is set for each IAB node under the IAB donor, and wherein in a case where a sum of the number of equipments connected to the first IAB node and the number of equipments connected to at least one IAB node connected on a downstream side of the first IAB node on the first communication path exceeds the allowable accommodation number set for the first IAB node, the IAB donor determines to change the connection destination of the second IAB node to a third IAB node constituting a communication path different from the first communication path;

changing, based on a determination to change the communication path, a connection destination of the second IAB node to the third IAB node; and setting a second communication path for relaying communication between the second IAB node and equipment under the second IAB node, and the IAB donor via the third IAB node.

2. The IAB donor according to claim 1, wherein the IAB donor further determines a connection destination after change, and before the second IAB node connects to the third IAB node, at at least one IAB node including the third IAB node included in the second communication path formed in a case where the second IAB node is connected to the third IAB node, in a case where the sum of the number of equipments connected to the IAB node and the number of equipments connected to another IAB node connected on a downstream side of the IAB node does not exceed the allowable accommodation number set for the IAB node, the IAB donor determines to connect the second IAB node to the third IAB node.

3. The IAB donor according to claim 1, wherein after the IAB donor sets the second communication path, the IAB donor determines whether the number of equipments exceeds the allowable accommodation number at each IAB node included in the second communication path, and before the second communication path is set, does not perform the determination.

4. The IAB donor according to claim 1, wherein the allowable accommodation number is set based on the number of hops starting from the IAB donor up to an IAB node on a communication path.

5. The IAB donor according to claim 1, wherein the allowable accommodation number is set based on the number of IAB nodes starting from the IAB donor and connected on a downstream side.

6. The IAB donor according to claim 1, wherein the IAB donor further determines a connection destination after change, and the operations further include notifying, in a case where, for one of IAB nodes included in the second communication path, the LAB donor determines that one of the IAB donor and the IAB node to serve as the connection destination after change at which the sum regarding the IAB node does not exceed the allowable accommodation number set for the IAB node does not exist, the equipment connected to one of the first IAB node and the second IAB node of information representing that the equipments more than the allowable accommodation number are connected.

7. A control method of controlling an IAB donor in a wireless communication system using an Integrated Access and Backhaul (IAB) technique defined by the Third Generation Partnership Project (3GPP), the wireless communication system including at least one IAB node configured to relay communication between a core network and equipment, and an IAB donor configured to relay communication between at least one IAB node under the IAB donor and the core network, the method comprising:

specifying, based at least on communication with each of the IAB nodes under the IAB donor, a respective number of equipments that are connected to each of the IAB nodes under the IAB donor;

determining, based on a number of equipments connected on a first communication path including the IAB donor, a first IAB node connected on a downstream side of the IAB donor, and a second IAB node connected to the first IAB node on a downstream side of the first IAB node, whether to change a communication path, wherein an allowable accommodation number of equipments is set for each IAB node under the IAB donor, and wherein in a case where a sum of the number of equipments connected to the first IAB node and the number of equipments connected to at least one IAB node connected on a downstream side of the first IAB node on the first communication path exceeds the allowable accommodation number set for the first IAB node, the IAB donor determines to change the connection destination of the second IAB node to a third LAB node constituting a communication path different from the first communication path;

changing, based on a determination to change the communication path, a connection destination of the second IAB node to the third IAB node; and setting a second communication path for relaying communication between the second IAB node and equipment under the second IAB node, and the IAB donor via the third IAB node.

8. A non-transitory computer-readable storage medium that stores a program for causing a computer included in an IAB donor in a wireless communication system that uses an Integrated Access and Backhaul (IAB) technique defined by the Third Generation Partnership Project (3GPP) and includes at least one IAB node configured to relay communication between a core network and equipment, and an IAB donor configured to relay communication between at least one IAB node under the IAB donor and the core network, to:

specify, based at least on communication with each of the IAB nodes under the IAB donor, a respective number of equipments that are connected to each of the IAB nodes under the IAB donor;

determine, based on a number of equipments connected on a first communication path including the IAB donor, a first IAB node connected on a downstream side of the LAB donor, and a second IAB node connected to the first IAB node on a downstream side of the first IAB node, whether to change a communication path, wherein an allowable accommodation number of equipments is set for each IAB node under the IAB donor, and wherein in a case where a sum of the number of equipments connected to the first IAB node and the number of equipments connected to at least one IAB node connected on a downstream side of the first IAB node on the first communication path exceeds the allowable accommodation number set for the first IAB node, the IAB donor determines to change the connection destination of the second IAB node to a third IAB node constituting a communication path different from the first communication path;

change, based on a determination to change the communication path, a connection destination of the second IAB node to the third IAB node; and set a second communication path for relaying communication between the second IAB node and equipment under the second IAB node, and the LAB donor via the third IAB node.

9. A control apparatus in a wireless communication system including a relay device configured to relay communication between a base station and equipment, the control apparatus comprising:

one or more processors; and one or more memories that store computer-readable instructions for causing, when executed by the one or more processors, the one or more processors to execute operations including:

specifying, based at least on communication with relay devices under the control apparatus, a respective number of equipments that are connected to each of the relay device under the control apparatus;

determining, based on a number of equipments connected on a first communication path including the base station, a first relay device connected on a downstream side of the base station, and a second relay device connected to the first relay device on a downstream side of the first relay device, whether to change a communication path, wherein an allowable accommodation number of equipments is set for each relay device under the control apparatus, and wherein in a case where a sum of the number of equipments connected to the first relay device and the number of equipments connected to at least one relay device connected on a downstream side of the first relay device on the first communication path exceeds the allowable accommodation number set for the first relay device, the control apparatus determines to change the connection destination of the second relay device to a third relay device constituting a communication path different from the first communication path;

changing, based on a determination to change the communication path, a connection destination of the second relay device to the third relay device; and setting a second communication path for relaying communication between the second relay device and equipment under the second relay device, and the control apparatus via the third relay device.

10. The control apparatus according to claim 9, wherein the control apparatus is a control apparatus arranged in a core network to which the base station is connected by a backhaul line.

11. The control apparatus according to claim 9, wherein the base station is an IAB donor using an IAB (Integrated Access and Backhaul) technique defined by the Third Generation Partnership Project (3GPP).

* * * * *